(12) United States Patent
Arlabán Gabeiras et al.

(10) Patent No.: US 11,434,873 B2
(45) Date of Patent: Sep. 6, 2022

(54) METHOD FOR OPERATING ELECTRICAL MACHINES

(71) Applicant: NORDEX ENERGY SPAIN, S.A., Barasoain (Navarra) (ES)

(72) Inventors: Teresa Arlabán Gabeiras, Barasoain (Navarra) (ES); Jose Miguel García Sayés, Barasoain (Navarra) (ES); Ricardo Royo García, Barasoain (Navarra) (ES); Miguel Núñez Polo, Barasoain (Navarra) (ES)

(73) Assignee: NORDEX ENERGY SPAIN, S.A., Barasoain (ES)

( * ) Notice: Subject to any disclaimer, the term of this patent is extended or adjusted under 35 U.S.C. 154(b) by 0 days.

(21) Appl. No.: 16/421,899

(22) Filed: May 24, 2019

(65) Prior Publication Data
US 2019/0360464 A1    Nov. 28, 2019

(30) Foreign Application Priority Data
May 24, 2018   (EP) .................... 18382356

(51) Int. Cl.
| | |
|---|---|
| *F03D 7/04* | (2006.01) |
| *F03D 7/02* | (2006.01) |
| *H02P 9/00* | (2006.01) |
| *H02P 9/10* | (2006.01) |
| *H02P 101/15* | (2016.01) |
| *F03D 9/25* | (2016.01) |

(52) U.S. Cl.
CPC ............. *F03D 7/04* (2013.01); *F03D 7/0272* (2013.01); *F03D 7/042* (2013.01); *H02P 9/006* (2013.01); *H02P 9/007* (2013.01); *H02P 9/102* (2013.01); *H02P 9/105* (2013.01); *F03D 9/257* (2017.02); *F05B 2270/335* (2013.01); *F05B 2270/337* (2013.01); *H02P 2101/15* (2015.01)

(58) Field of Classification Search
CPC .......... F03D 7/04; F03D 7/0272; F03D 7/042; H02P 9/102; H02P 9/105; H02P 9/006; H02P 9/007; H02P 2101/15; F05B 2270/335; F05B 2270/337
See application file for complete search history.

(56) References Cited

U.S. PATENT DOCUMENTS

| | | | |
|---|---|---|---|
| 7,629,705 B2 | 12/2009 | Barker et al. | |
| 9,140,744 B2* | 9/2015 | Zheng | G01R 31/2827 |
| 2006/0192390 A1* | 8/2006 | Juanarena Saragueta | H02P 9/102 290/44 |

(Continued)

FOREIGN PATENT DOCUMENTS

| | | | |
|---|---|---|---|
| EP | 2902621 A1 * | 8/2015 | ............ F03D 7/048 |
| EP | 2902621 A1 | 8/2015 | |

*Primary Examiner* — Sean Gugger
(74) *Attorney, Agent, or Firm* — Lathrop GPM LLP

(57) ABSTRACT

A solution to optimally manage those requirements ensuring on the one hand, that the requirements set by the grid operators are appropriately and accurately accomplished at a point of interconnection (POI) and on the other hand, preventing the wind turbines from over fulfilling the requirements, for example, by remaining connected at voltages levels higher or lower than the ones required which, although possible, may cause higher loads and currents in the wind turbines than needed to fulfill the requirements.

17 Claims, 5 Drawing Sheets

(56) References Cited

U.S. PATENT DOCUMENTS

| | | | |
|---|---|---|---|
| 2008/0157529 A1* | 7/2008 | Rivas | H02P 9/007 |
| | | | 290/44 |
| 2008/0252076 A1* | 10/2008 | Fortmann | F03D 9/255 |
| | | | 290/44 |
| 2009/0250931 A1 | 10/2009 | Schubert et al. | |
| 2014/0339830 A1 | 11/2014 | Gupta et al. | |

* cited by examiner

METHOD FOR OPERATING ELECTRICAL MACHINES

CROSS-REFERENCE TO RELATED APPLICATIONS AND PRIORITY

This patent application claims priority from EP Patent Application No. 18382356.6 filed May 24, 2018, which is herein incorporated by reference in its entirety.

FIELD OF THE INVENTION

This invention relates generally to electrical machines and more particularly, to methods and apparatus for operating electrical machines.

BACKGROUND OF THE INVENTION

Generally, a wind turbine includes a turbine that has a rotor that includes a rotatable hub assembly having multiple blades. The blades transform mechanical wind energy into a mechanical rotational torque that drives a generator via a shaft. The rotor is generally rotationally coupled to the generator through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbine generators also exist. The rotor, generator, gearbox and other components are typically mounted within a housing, or nacelle, that is positioned on top of a base that may be a truss or tubular tower.

Some geared configurations include doubly fed induction generators (DFIGs). Such configurations may also include an induction generator and a power converter used to control currents according to active and reactive power references set for the wind turbine (WT) to comply with certain grid code requirements.

Under certain circumstances, a fault in a utility grid may occur that may cause low voltage dips with voltage fluctuations that approach zero volts. Other kind of events may also cause an overvoltage.

Generally, the utility grid operators require the wind turbines to accomplish certain requirements during those kind of faults in order to be given the permits to be connected to the grid. These requirements include, among others, remaining connected to the grid during predetermined voltage vs. time curves specified at a point of interconnection to the grid. Voltage in those curves is given in per unity [pu].

Document U.S. Pat. No. 7,629,705B2 provides a method including configuring a generator such that it remains electrically connected to the grid during and subsequent to a voltage amplitude of the electric power decreasing to approximately zero volts for a predetermined period of time, thereby facilitating zero voltage ride through (ZVRT).

SUMMARY OF THE INVENTION

Prior art solutions do not state how requirements set by the operator at a point of interconnection to the grid of the wind farm electric system are managed by the control system of the wind turbine which generally handles local measurements made at the wind turbine terminals.

This invention provides a solution to optimally manage those requirements ensuring on the one hand, that the requirements set by the grid operators are appropriately and accurately accomplished at a point of interconnection (POI) and on the other hand, preventing the wind turbines from over fulfilling the requirements, for example, by remaining connected at voltages levels higher or lower than the ones required which, although possible, may cause higher loads and currents in the wind turbines than needed to fulfill the requirements. This solution avoids those drawbacks, as the wind turbines no longer use values specified for another point of the electrical power system (like the point of interconnection (POI)) but values appropriate for their own point of connection to the electrical power system. For example, during a voltage tip, the voltage level at wind turbine terminals may be higher than the voltage level at the point of interconnection (POI). Nevertheless, if a voltage dip profile requirement set for the point of interconnection (POI) is used in the wind turbine control software, the wind turbine will remain connected at voltage levels lower than the ones needed to fulfill the grid code requirements and will cause the wind turbine to be exposed to higher currents and loads.

The method for operating an electric machine and the wind turbine comprising an electrical machine according to the invention is disclosed in claims 1-28.

DETAILED DESCRIPTION OF THE INVENTION

Figure 1:
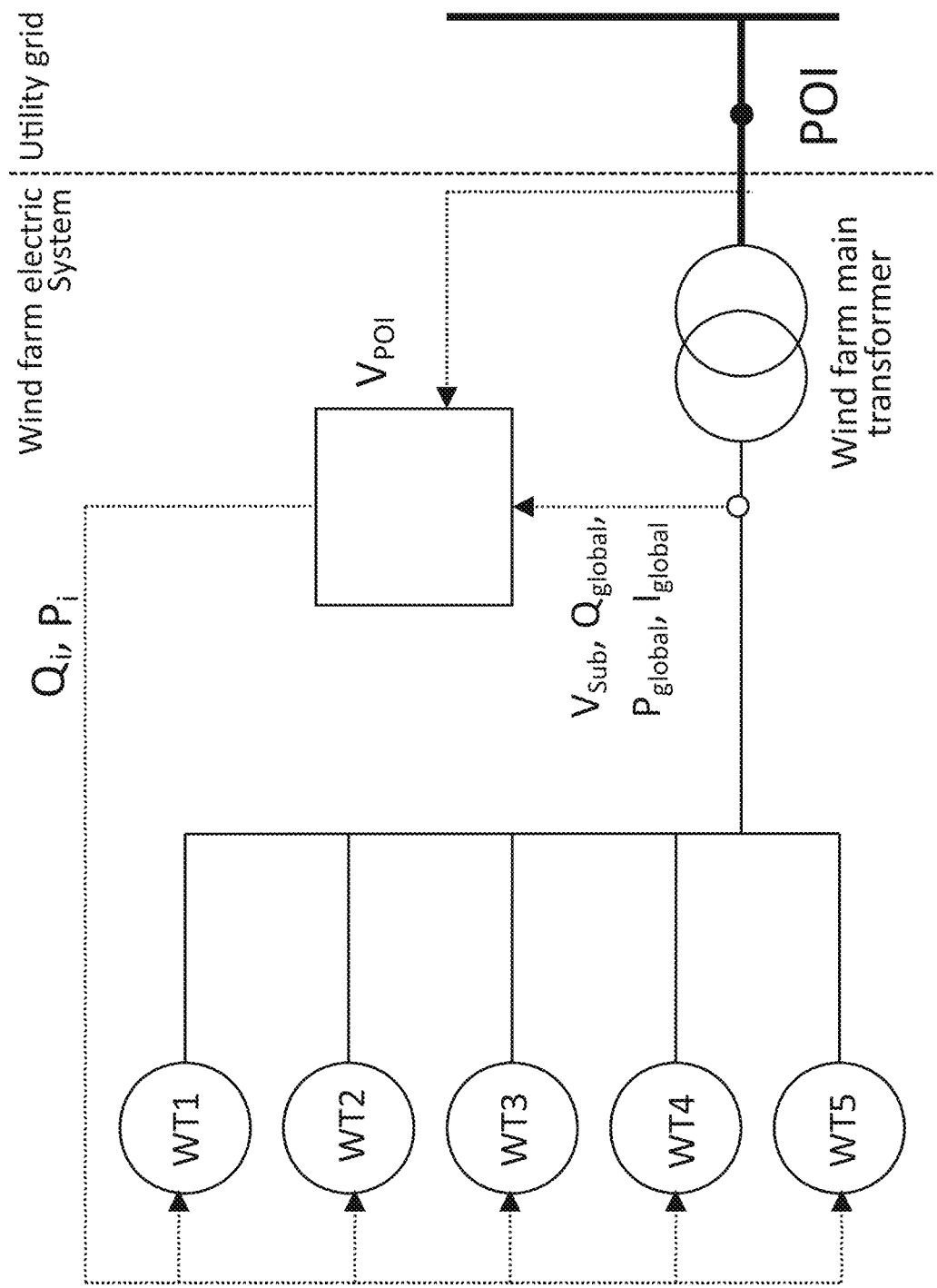
FIG. 1 shows a single line diagram of a wind farm consisting of 5 wind turbines connected to an electric power system for which the method for operating an electric machine of the present invention is carried out, being the electric machine a wind turbine.

As schematically shown in FIG. 1, wind turbines are generally connected to an electric power system that comprises at least a wind farm electric system and an external electric grid (utility grid) to which other generators and loads are connected. The electric power system may further comprise a wind farm main transformer at a point of interconnection (POI) of the wind farm electric system to the external electric grid to adapt the voltage level of the wind farm electric system to the voltage level of the external electric grid.

Figure 2:
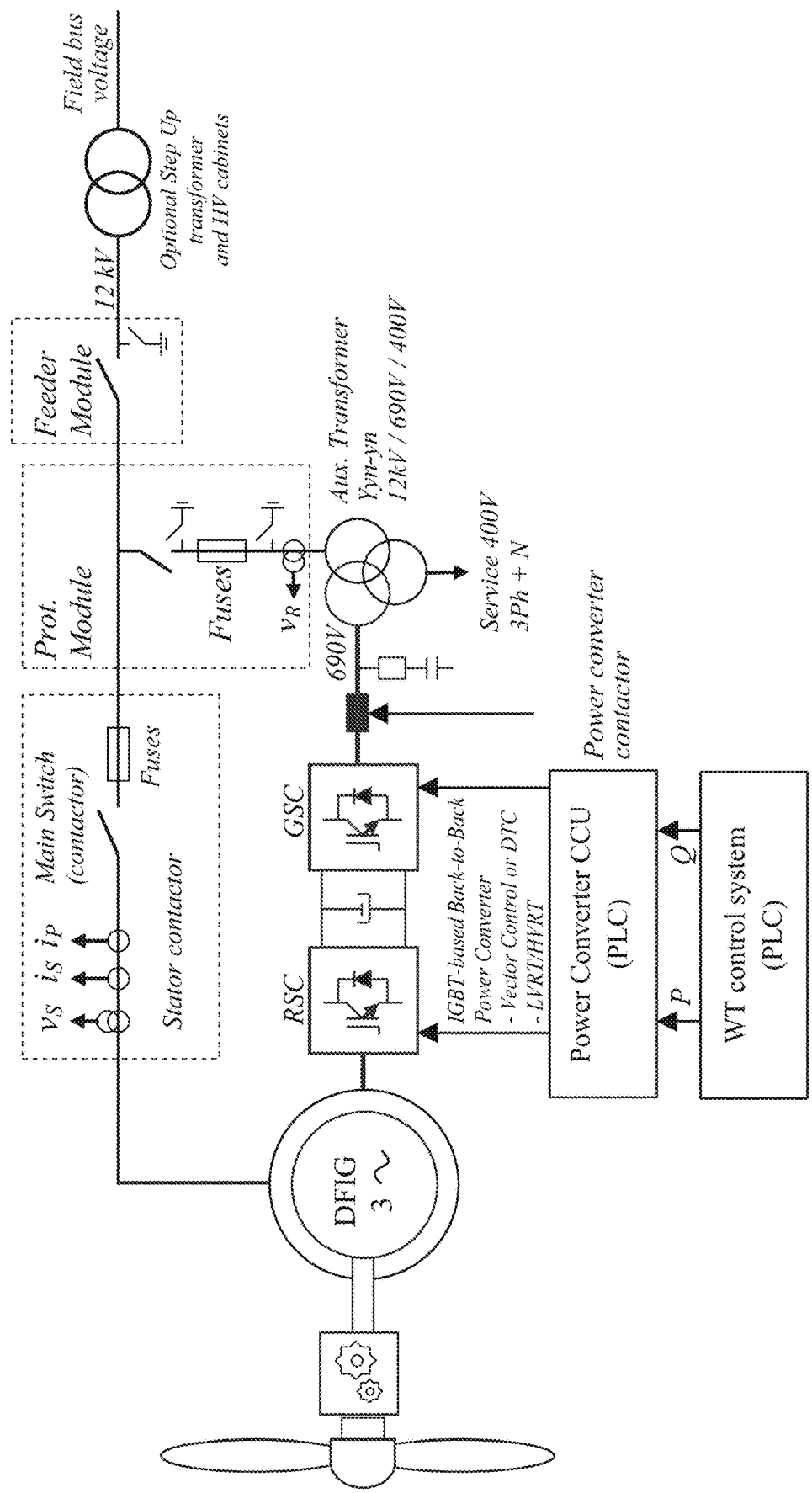
FIG. 2 shows a first embodiment of a simplified electrical power circuit of a wind turbine according to the invention, for which the method for operating an electric machine of the present invention is carried out.
Figure 3:
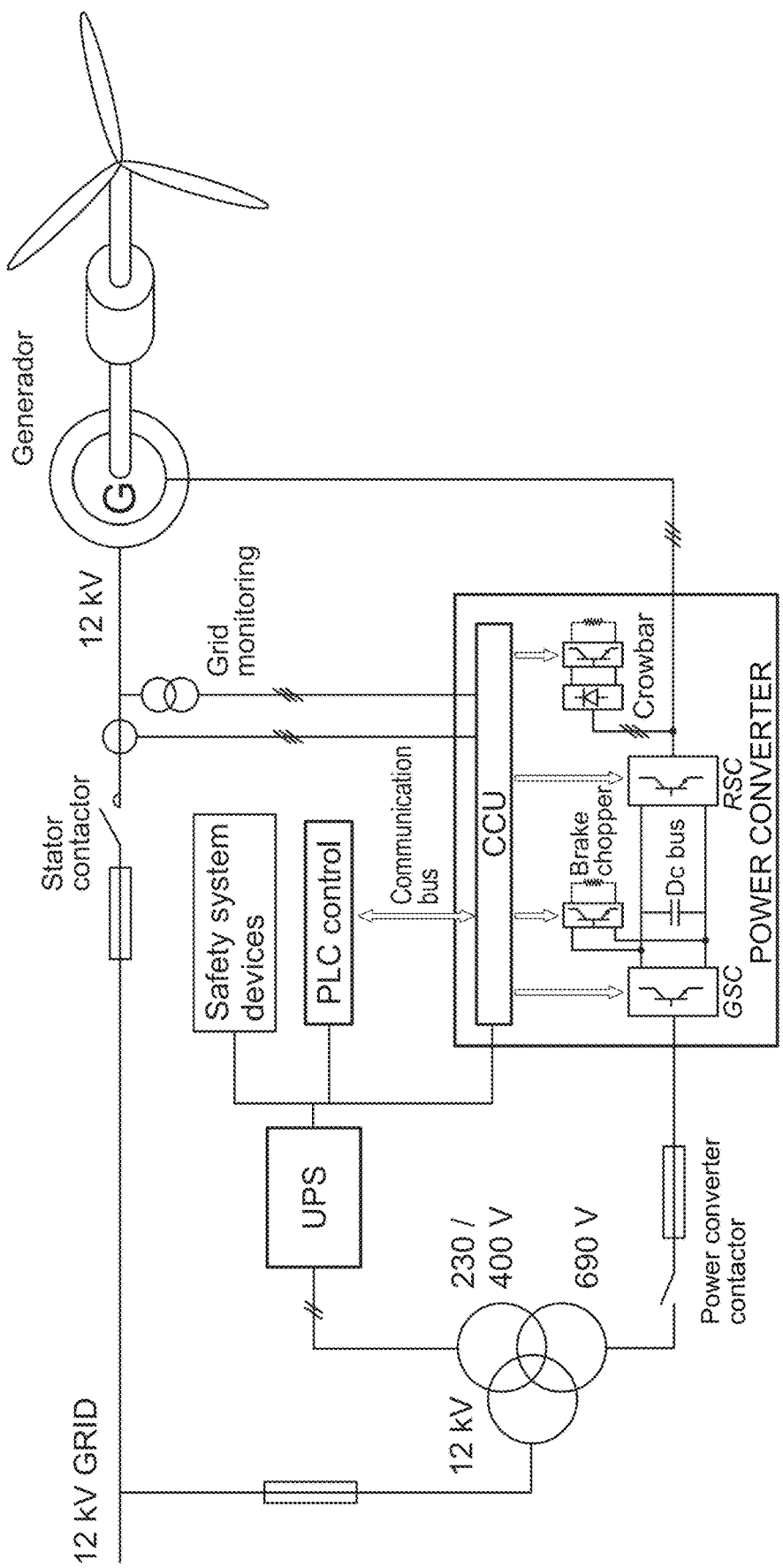
FIG. 3 shows a second embodiment of a simplified electrical power circuit of a wind turbine according to the invention, for which the method for operating an electric machine of the present invention is carried out.

FIGS. 2 and 3 show simplified electrical power circuits of a wind turbine according to the invention. The wind turbine comprises an electrical machine comprising in particular a doubly fed induction generator (DFIG), that is electronically controlled by a power converter which connects the rotor to the electric power system. The power converter comprises a rotor side converter (RSC) and a grid side converter (GSC) connected through a DC link. In the embodiment, the rated stator line voltage is 12 kV. Active power (P) and reactive power (Q) generated by the DFIG are controlled through the rotor currents that are in turn controlled by means of a power converter based on IGBTs. In a particular embodiment, power converter supply is 690V while auxiliary services require 400V, thus requiring a step-down transformer 12 kV/690V/400V.

In an embodiment, the wind turbine comprises a control system (wind turbine control system, referred to as PLC control in FIG. 3) that is configured to send among others power set points to a power converter controller (CCU) through a communication bus which hereinafter controls currents in order to comply with the received set points.

In an embodiment, the wind turbine comprises two main controllable contactors, i.e. the stator contactor and the power converter contactor, which can be operated in a controlled manner to at least partially disconnect the wind turbine from the electric power system. In particular, the contactors can be controlled depending on a series of wind turbine variables such as for example mechanical variables (including rotor speed, acceleration or vibration measurements) or electrical variables (current or voltage measurements).

Grid monitoring devices such as current and voltage sensors are connected to the wind turbine terminals, at least to the stator terminals and/or to the power converter terminals at the high voltage side of the auxiliary transformer, to obtain some voltage and current measurements (Vs, Vr, is, ip) that will be used for controlling the wind turbine, specifically the power converter and the controllable contactors.

For field bus voltages higher than 12 kV, the wind turbine may comprise also a set consisting of an optional step up transformer and high voltage cabinets (operation and protection) that can be placed inside the wind turbine tower, as shown in FIG. 2.

According to the invention, the wind turbine includes some specific devices in order to remain connected during voltage dips (undervoltages) and overvoltages in the electric power system (usually known as to be able to ride through voltage faults, or voltage dip ride through capability). These devices may include among others:
  an active crowbar connected to the rotor terminals and/or a brake chopper connected to the DC link of the power converter, to protect the power converter from excessive over currents;
  an uninterruptible Power Supply (UPS) to power the wind turbine control systems during the faults.

Those devices are generally designed to permit different configurations of the wind turbines to fulfil the requirements of local grid operators in any country: EON (Germany), NGC (England), FERC (EEUU), etc.

Adequate dimensioning of the abovementioned wind turbine devices may enable the wind turbines to ride through even 0%-voltage three-phase short-circuits longer than 150 ms at the point of interconnection of the WF electrical system to the grid.

Figure 4:
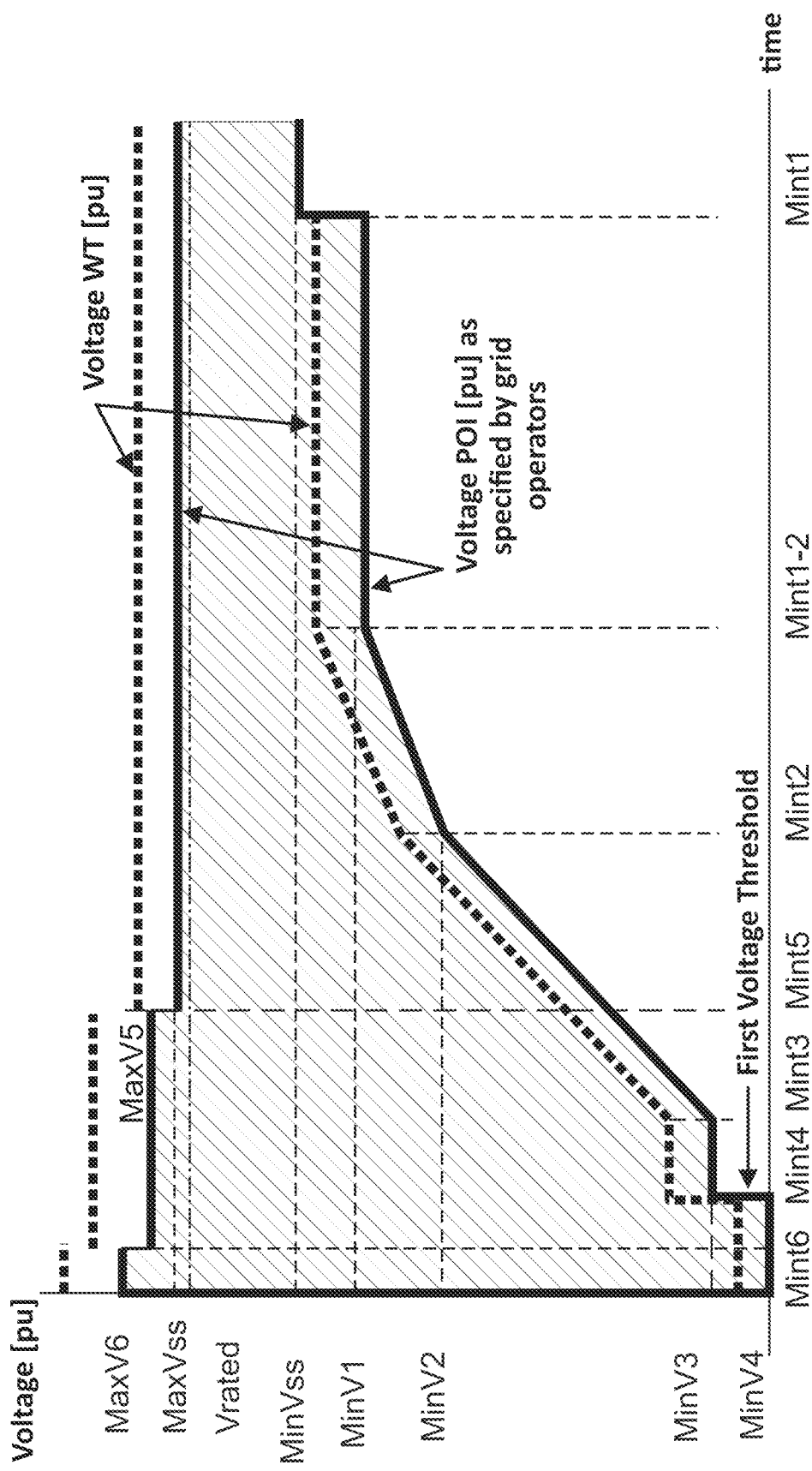
FIG. 4 shows an example of a voltage vs. time curve in which a wind turbine has to remain connected as could be specified by a grid operator according to the method for operating an electric machine of the present invention.

FIG. 4 depicts an exemplary voltage vs. time curve in which a wind turbine has to remain connected as could be specified by a grid operator. It typically includes a predetermined voltage range, so called steady state voltage range (generally including+/−10% of rated voltage) where the wind turbines are required to operate normally. Outside the steady state voltage range and above, over voltages are stood depending on their duration and level. For example, the wind turbine is configured to ride through overvoltages up to +15% for 1 second while overvoltages up to 20% of the rated voltage are admitted during 100 ms as a maximum.

Grey area in FIG. 4 (within the thick continuous lines) shows an example of a voltage at the POI vs. time region where the wind turbine is required to operate by the grid operators. Outside that region the wind turbine can stop. Steady state operation is limited between MaxVss and MinVss generally at 110% of Vrated and 90% of Vrated respectively. Beyond those limits but within the grey area the wind turbine must at least remain connected to the grid.

FIG. 4 further shows, represented by thick dotted lines, per unity voltage values at the terminals of a particular wind turbine (Voltage wind turbine [pu]) corresponding to the voltage at the POI limits set by the grid operator corresponding to the thick continuous lines (Voltage POI [pu]). This difference between the POI voltage values and the wind turbine voltage values is due to the current generated by the wind turbines in the wind farm and the impedance of the electrical components connected between the wind turbines and the POI, mainly consisting of, but not limited to, power lines and transformers.

Figure 5:
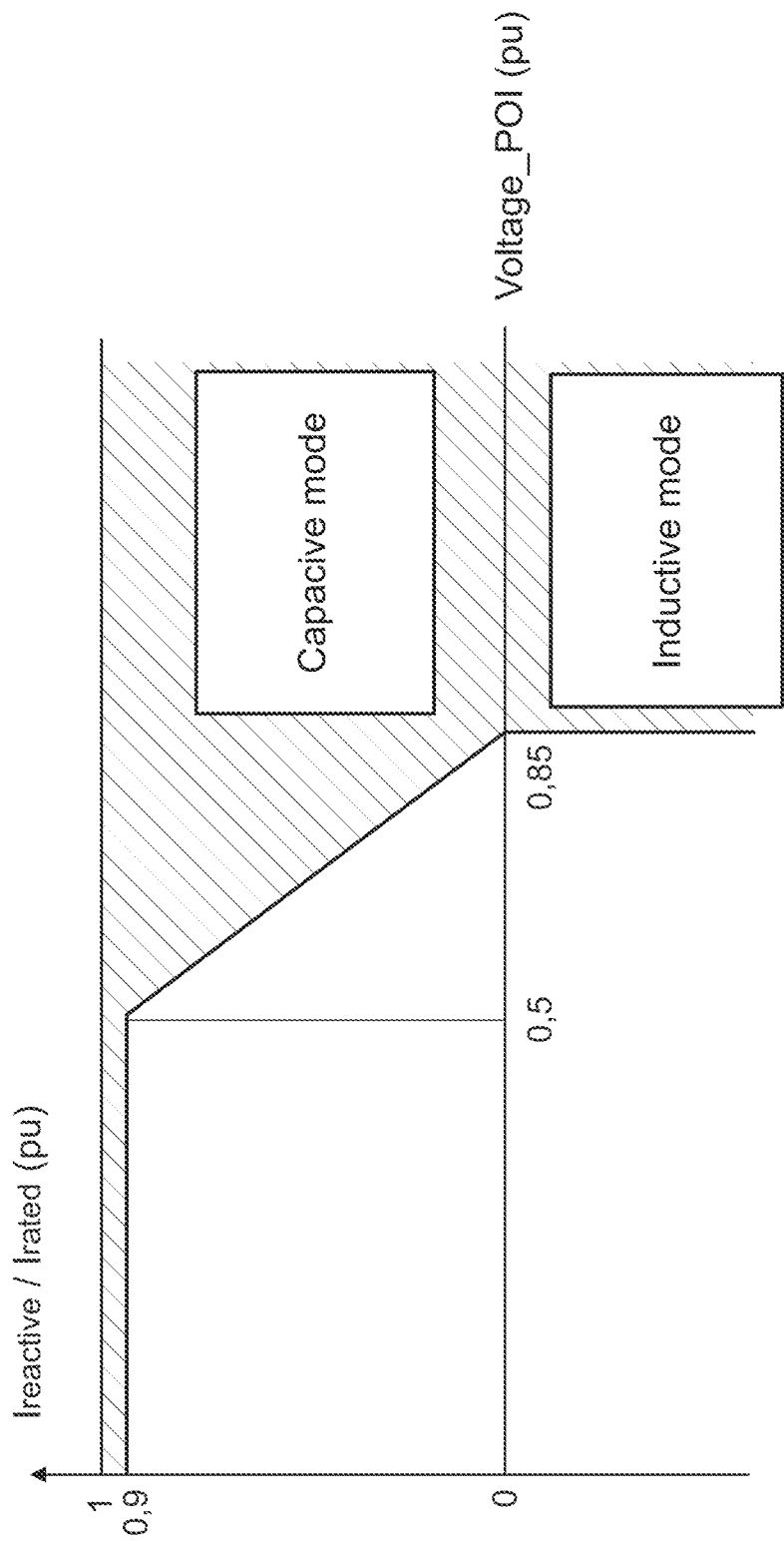
FIG. 5 shows an example of a reactive current injection requirement during a voltage dip according to the method for operating an electric machine of the present invention.

Additionally, grid operators commonly require a certain reactive power or reactive current injection depending on the voltage value during a voltage fault (either being an undervoltage or an overvoltage). FIG. 5 shows an example of the reactive current injection required according to the voltage level.

As it has been explained, the voltage level in pu at the point of interconnection (POI) differs from the voltage level in pu at the wind turbine terminals at a given time due to the existing impedance between the wind turbine terminals and the point of interconnection (POI).

According to a first embodiment of the invention, a method for operating an electrical machine is provided, said method comprising:
  coupling the electrical machine to an electric power system such that the electric power system is configured to transmit at least one phase of electric power to the electrical machine; and
  configuring the electrical machine such that the electrical machine remains electrically connected to the electric power system during and subsequent to a voltage amplitude of the electric power system operating outside of a predetermined range for an undetermined period of time, wherein configuring the electrical machine comprises:
    i. electrically coupling at least a portion of a control system to at least a portion of the electric power system;
    ii. coupling the control system in electronic data communication with at least a portion of the electrical machine.

According to this first embodiment of the invention, the electrical machine and the control system are further configured such that:
  i. the electrical machine remains electrically connected to the electric power system during and subsequent to the voltage amplitude of the electric power system decreasing below the predetermined range but remaining above a first voltage threshold indicative of a fault within a wind farm electric system for the undetermined period of time,
  ii. the control system is further configured to at least partially disconnect the electrical machine from the electric power system when the voltage amplitude of the electric power system decreases below the first voltage threshold.

The first voltage threshold for the voltage of the electric power system is indicative of a fault within a wind farm electric system, i.e. if the first signal indicative of the voltage amplitude of an electric power system lies below the first voltage threshold, it indicates that a fault may have occurred between the wind turbine terminals and a point of interconnection of the wind farm to the grid.

In particular, the first voltage threshold corresponds to a voltage value so low that it could only be produced by a fault internal to the wind farm.

Again, when a voltage dip occurs, wind turbines are configured to feed reactive power or current to support the grid to overcome the fault. This feature implies that even if there is a fault, a certain voltage difference will exist between the wind turbines terminals (where the voltage measurements that are used for controlling the wind turbines during the fault are usually taken in order to comply with a certain speed of response required by grid operators) and the high voltage side of the wind farm main transformer at the point of interconnection of the wind farm electric system to the external electric grid due to the impedance existing between those electric power system locations. It is at this point of the power system, the POI, where the requirements for the wind turbines are specified by the grid operator in terms of: i. voltage vs. time profile at which the wind turbines are required to remain connected (FIG. 4) and ii. reactive power or current generation vs. voltage (FIG. 5).

In such an embodiment, the voltage at the wind turbine terminals is used to determine the voltage amplitude of the electric power system. As it has been explained, due to the existing impedance between the wind turbine terminals and the point of interconnection of the wind farm to the grid and the reactive current generation supplied by the wind turbines, the voltage at the wind turbine terminals is higher that the voltage at the point of interconnection. Due to this, even in the case of a zero volts fault (ZVF) at the POI, some voltage might be measured at the wind turbine terminals.

The first voltage threshold is determined as the voltage at the wind turbine terminals corresponding to a ZVF at the POI, as depicted in FIG. 4. It enables to differentiate those voltage measurements values corresponding to a grid fault, during which the wind turbines are required to remain connected to the electric power system, from voltage measurements values corresponding to an internal fault, during which the wind turbines should be disconnected from the electric power system to avoid unnecessary loading and or heating of the wind turbine components.

Hence, the invention provides a control method for a wind turbine comprising an electrical machine and a control system, the control method comprising the following steps:
Determining a first signal indicative of the voltage of an electric power system
Providing a first voltage threshold for the voltage of the electric power system indicative of a fault within a wind farm electric system
Comparing the first signal indicative of the voltage of an electric power system with the first voltage threshold,
At least partially disconnecting the wind turbine from the grid when the first signal of the voltage of an electric power system is lower than the first voltage threshold.

The invention further includes, according to the embodiment, determining the voltage amplitude of the electric power system based on voltage measurements made at the wind turbine terminals (Vs, Vr).

The invention further includes, according to the embodiment, generating reactive power or current at least as soon as the first signal indicative of the voltage of the electric power system decreases below 20%.

The invention further includes, according to the embodiment, that the control system is configured to calculate (for example, by means of an algorithm programmed within the control system) the first voltage threshold based on a minimum voltage level (MinV4 of FIG. 4) at the point of interconnection (POI), the minimum voltage level being zero volts, and the impedance of the electrical components connected between the POI and the wind turbines.

According to the invention, the control system is also configured to calculate the first voltage threshold based either on i. a measured reactive power or current generated by the wind turbine or ii. a predetermined reactive power or current generated by the wind turbine at the minimum voltage level at the point of interconnection (POI) at which the grid operator requires the wind turbine to remain connected.

Alternatively, the first voltage threshold is predetermined by means of simulations prior to configuring the control system. In particular, the first voltage threshold can be predetermined by means of simulations and according to theoretical models of the wind turbines, wind farm electric system and of the utility grid, and considering a zero voltage dip at the point of interconnection (POI). The first voltage threshold is greater than or equal to 5% of the rated voltage pu. The first threshold can be different at each wind turbine in the wind farm, as it depends on the impedances comprised in the wind farm electric system and the current distribution along the wind farm electric system, this being dependent on the current generated by each wind turbine.

According to the invention, the step of at least partially disconnecting the wind turbine from the grid comprises at least opening a controllable contactor. In particular, it comprises opening a stator contactor. It can further comprise opening a power converter contactor in order to completely disconnect the wind turbine from the grid.

In an embodiment, the first voltage threshold is part of a voltage vs. time curve that comprises per unity voltage values at the terminals of the wind turbine (Voltage wind turbine [pu]) corresponding to the per unity voltage at the POI limits set by the grid operator (corresponding to the thick continuous lines (Voltage POI [pu]) in FIG. 4). The control system is further configured to compare voltage measurements at the wind turbine terminals with the voltage vs. time curve that comprises per unity voltage values at the terminals of the wind turbine (Voltage wind turbine [pu]) corresponding to the per unity voltage at the POI limits set by the grid operator, and disconnect the wind turbine from the electric power system when the voltage measurements lie outside the abovementioned voltage vs. time curve.

The invention claimed is:
1. A method for operating a plurality of wind turbines, said method comprising:
coupling each wind turbine of the plurality of wind turbines to an electric power system such that the electric power system is configured to transmit at least one phase of electric power to the respective wind turbine; and
configuring each wind turbine such that the respective wind turbine remains electrically connected to the electric power system during and subsequent to a voltage amplitude of the electric power system operating outside of a predetermined range for an undetermined period of time, wherein configuring each wind turbine comprises:

electrically coupling at least a portion of a control system of each respective wind turbine to at least a portion of the electric power system;

coupling each control system in electronic data communication with at least a portion of the respective wind turbine; and configuring each wind turbine and the respective control system such that:
i. each wind turbine remains electrically connected to the electric power system during and subsequent to the voltage amplitude of the electric power system, as obtained at terminals of the respective wind turbine, decreasing below the predetermined range but remaining above a first voltage threshold for the respective wind turbine indicative of a fault within a wind farm electric system of which the plurality of wind turbines is a part for the undetermined period of time and
ii. each control system is further configured to at least partially disconnect the respective wind turbine from the electric power system when the voltage amplitude of the electric power system, as obtained at the terminals of the respective wind turbine, decreases below the first voltage threshold for the respective wind turbine;

wherein the first voltage threshold for the respective wind turbine is part of a voltage versus time curve that comprises per unity voltage values at the terminals of the respective wind turbine, the per unity voltage values at the terminals corresponding to, but differing from, per unity voltage value limits for a point of interconnection between the wind farm electric system and an external electric grid as set by an operator of the electric power system, wherein the first voltage threshold for each wind turbine may differ from the first voltage threshold for each other wind turbine in the plurality of wind turbines, and wherein the first voltage threshold for a respective wind turbine is calculated based on a minimum voltage level at the point of interconnection (POI) at which a grid operator requires each wind turbine to remain connected and an impedance between the respective wind turbine terminals and the point of interconnection.

2. The method of claim 1, further comprising configuring each control system to disconnect the respective wind turbine from the electric power system completely when the voltage amplitude of the electric power system, as obtained at the terminals of the respective wind turbine, decreases below the first voltage threshold.

3. The method of claim 1 further comprising generating reactive power or reactive current at least as soon as a first signal indicative of the voltage amplitude of the electric power system, as obtained at the terminals of a respective wind turbine, decreases below 20%.

4. The method of claim 1 wherein the first voltage threshold for the respective wind turbine is calculated further based on a predetermined reactive current generated by the respective wind turbine at the minimum voltage level at the point of interconnection (POI) at which the grid operator requires each wind turbine to remain connected.

5. The method of claim 3 wherein the first voltage threshold for a respective wind turbine is calculated further based on a measured reactive current generated by the respective wind turbine.

6. The method of claim 1 wherein the first voltage threshold for a respective wind turbine is predetermined by means of simulations prior to configuring the respective control system and according to theoretical models of the plurality of wind turbines, the wind farm electric system and of the external electric grid, and considering a zero voltage dip at the point of interconnection (POI).

7. The method of claim 1 wherein the first voltage threshold for each wind turbine is at least >5% Vpu.

8. The method of claim 1 wherein each control system at least partially disconnecting the respective wind turbine from the electric power system comprises at least opening a controllable contactor by the respective controller.

9. A wind farm electric system comprising a plurality of wind turbines comprising:

each wind turbine of the plurality of wind turbines coupled to an electric power system such that the electric power system is configured to transmit at least one phase of electric power to the respective wind turbine; and wherein each wind turbine is configured such that the respective wind turbine remains electrically connected to the electric power system during and subsequent to a voltage amplitude of the electric power system operating outside of a predetermined range for an undetermined period of time, wherein:

at least a portion of a control system of each respective wind turbine is electrically coupled to at least a portion of the electric power system;

each control system is coupled in electronic data communication with at least a portion of the respective wind turbine; and each wind turbine and the respective control system are also configured such that
i. each wind turbine remains electrically connected to the electric power system during and subsequent to the voltage amplitude of the electric power system, as obtained at terminals of the respective wind turbine, decreasing below the predetermined range but remaining above a first voltage threshold for the respective wind turbine indicative of a fault within a wind farm electric system of which the plurality of wind turbines is a part for the undetermined period of time and
ii. each wind turbine is at least partially disconnected from the electric power system by means of the respective control system when the voltage amplitude of the electric power system, as obtained at the terminals of the respective wind turbine, decreases below the first voltage threshold for the respective wind turbine;

wherein the first voltage threshold for the respective wind turbine is part of a voltage versus time curve that comprises per unity voltage values at the terminals of the respective wind turbine, the per unity voltage values at the terminals of the respective wind turbine corresponding to, but differing from, per unity voltage value limits for a point of interconnection between the wind farm electric system and an external electric grid as set by an operator of the electric power system, wherein the first voltage threshold for each wind turbine may differ from the first voltage threshold for each other wind turbine in the plurality of wind turbines, and wherein each control system is also configured to calculate the first voltage threshold for the respective wind turbine based on a minimum voltage level at the point of interconnection (POI) at which a grid operator requires the respective wind turbine to remain connected and an impedance between the respective wind turbine terminals and the point of interconnection.

10. The wind farm electric system of claim 9, wherein each control system is also configured to completely disconnect the respective wind turbine from the electric power system when the voltage amplitude of the electric power system, as obtained at the terminals of the respective wind turbine, decreases below the first voltage threshold.

11. The wind farm electric system of claim 9 wherein each control system is also configured to generate reactive power or reactive current at least as soon as a first signal indicative of the voltage amplitude of the electric power system, as obtained at the terminals of the respective wind turbine, decreases below 20%.

12. The wind farm electric system of claim 9 wherein the first voltage threshold for the respective wind turbine is calculated by means of the respective control system further based on a predetermined reactive current generated by the respective wind turbine at the minimum voltage level at the point of interconnection (POI) at which the grid operator requires each wind turbine to remain connected.

13. The wind farm electric system of claim 11 wherein the first voltage threshold for the respective wind turbine is calculated by means of the respective control system further based on a measured reactive current generated by the respective wind turbine.

14. The wind farm electric system of claim 9 wherein the first voltage threshold for each wind turbine is at least >5% Vpu.

15. The wind farm electric system of claim 14 wherein each control system is also configured to at least open a controllable contactor when the respective control system at least partially disconnects the respective wind turbine from the electric power system.

16. The wind farm electric system of claim 15 wherein the controllable contactor comprises a stator contactor.

17. A method for operating a plurality of wind turbines, said method comprising:
coupling each wind turbine of the plurality of wind turbines to an electric power system such that the electric power system is configured to transmit at least one phase of electric power to the respective wind turbine; and
configuring each wind turbine such that the respective wind turbine remains electrically connected to the electric power system during and subsequent to a voltage amplitude of the electric power system operating outside of a predetermined range for an undetermined period of time, wherein configuring each wind turbine comprises:

electrically coupling at least a portion of a control system of each respective wind turbine to at least a portion of the electric power system;

coupling each control system in electronic data communication with at least a portion of the respective wind turbine; and configuring each wind turbine and the respective control system such that:
i. each wind turbine remains electrically connected to the electric power system during and subsequent to the voltage amplitude of the electric power system, as obtained at terminals of the respective wind turbine, decreasing below the predetermined range but remaining above a first voltage threshold for the respective wind turbine indicative of a fault within a wind farm electric system of which the plurality of wind turbines is a part for the undetermined period of time and ii. each control system is further configured to at least partially disconnect the respective wind turbine from the electric power system when the voltage amplitude of the electric power system, as obtained at the terminals of the respective wind turbine, decreases below the first voltage threshold for the respective wind turbine;

wherein the first voltage threshold for the respective wind turbine is part of a voltage versus time curve that comprises per unity voltage values at the terminals of the respective wind turbine, the per unity voltage values at the terminals corresponding to, but differing from, per unity voltage value limits for a point of interconnection between the wind farm electric system and an external electric grid as set by an operator of the electric power system, wherein the first voltage threshold for each wind turbine may differ from the first voltage threshold for each other wind turbine in the plurality of wind turbines, and wherein the first voltage threshold for a respective wind turbine is predetermined by means of simulations prior to configuring the respective control system and according to theoretical models of the plurality of wind turbines, the wind farm electric system and of the external electric grid, and considering a zero voltage dip at the point of interconnection (POI).

* * * * *